(12) United States Patent
Brunhuber et al.

(10) Patent No.: US 12,494,682 B2
(45) Date of Patent: Dec. 9, 2025

(54) ROTOR FOR PERMANENT MAGNET SYNCHRONOUS MACHINE, AND PERMANENT MAGNET SYNCHRONOUS MACHINE

(71) Applicant: Bayerische Motoren Werke Aktiengesellschaft, Munich (DE)

(72) Inventors: Stefan Brunhuber, Moosburg (DE); Denes Dobberke, Unterschleissheim (DE); Aleksander Jerin, Puchheim (DE); Daniel Meckl, Hallbergmoos (DE); Stefan Weindl, Holzkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 282 days.

(21) Appl. No.: 18/019,938

(22) PCT Filed: Oct. 11, 2021

(86) PCT No.: PCT/EP2021/077979
§ 371 (c)(1),
(2) Date: Feb. 6, 2023

(87) PCT Pub. No.: WO2022/089920
PCT Pub. Date: May 5, 2022

(65) Prior Publication Data
US 2023/0291254 A1    Sep. 14, 2023

(30) Foreign Application Priority Data
Oct. 30, 2020   (DE) .................... 10 2020 128 552.3

(51) Int. Cl.
*H02K 1/276* (2022.01)
(52) U.S. Cl.
CPC .................... *H02K 1/276* (2013.01)

(58) Field of Classification Search
CPC ............................ H02K 1/2766; H02K 1/276
(Continued)

(56) References Cited

U.S. PATENT DOCUMENTS

| 6,552,462 B2 * | 4/2003 | Sakai | H02K 1/246 |
| | | | 310/156.56 |
| 7,804,216 B2 * | 9/2010 | Takahashi | H02K 1/2766 |
| | | | 310/156.55 |

(Continued)

FOREIGN PATENT DOCUMENTS

| DE | 199 15 664 A1 | 10/2000 |
| DE | 10 2009 026 287 A1 | 2/2011 |

(Continued)

OTHER PUBLICATIONS

Translation of Foreign Patent Document DE 102017205858 A1 (Year: 2018).*

(Continued)

*Primary Examiner* — Alex W Mok
(74) *Attorney, Agent, or Firm* — Crowell & Moring LLP (57) ABSTRACT

A rotor for a permanent magnet synchronous machine includes a laminated core having recesses in which respective permanent magnets are received. Each recess has a first end region which is closer to an axis of rotation of the rotor than a second end region. The permanent magnets are arranged in recesses which are adjacent to one another and of which the first end regions are closer to one another in the circumferential direction of the rotor than the second end regions. This arrangement is such that similar poles of the permanent magnets face one another. The rotor has a holding part by way of which a first portion of the laminated core is coupled to a second portion of the laminated core. The holding part has a lower magnetic conductivity than a (Continued)

subregion of the laminated core, the volume of which is equal to a volume of the holding part.

12 Claims, 3 Drawing Sheets

(58) Field of Classification Search
USPC .................................................. 310/156.56
See application file for complete search history.

(56) References Cited

U.S. PATENT DOCUMENTS

| | | | |
|---|---|---|---|
| 8,896,175 B2* | 11/2014 | Cirani | H02K 1/2766 310/156.08 |
| 2013/0026871 A1 | 1/2013 | Van Dam et al. | |
| 2016/0226326 A1* | 8/2016 | Gotschmann | H02K 1/2766 |
| 2016/0352164 A1* | 12/2016 | Mochida | H02K 21/14 |
| 2019/0165625 A1 | 5/2019 | Dajaku | |

FOREIGN PATENT DOCUMENTS

| | | |
|---|---|---|
| DE | 10 2016 114 362 A1 | 2/2018 |
| DE | 10 2017 205 858 A1 | 4/2018 |
| DE | 10 2018 201 591 A1 | 8/2019 |
| IT | 1396866 B1 | 5/2011 |
| JP | 2009-201269 A | 9/2009 |
| JP | 2010-193660 A | 9/2010 |
| WO | WO 2006/003244 A2 | 1/2006 |

OTHER PUBLICATIONS

International Search Report (PCT/ISA/210) issued in PCT Application No. PCT/EP2021/077979 dated Feb. 1, 2022 with English translation (six (6) pages).

German-language Written Opinion (PCT/ISA/237) issued in PCT Application No. PCT/EP2021/077979 dated Feb. 1, 2022 (six (6) pages).

German-language Search Report issued in German Application No. 10 2020 128 552.3 dated Jan. 26, 2022 with partial English translation (13 pages).

Third Party Observation issued in PCT Application No. PCT/EP2021/077979 dated Jun. 15, 2022 (two (2) pages).

\* cited by examiner

ROTOR FOR PERMANENT MAGNET SYNCHRONOUS MACHINE, AND PERMANENT MAGNET SYNCHRONOUS MACHINE

BACKGROUND AND SUMMARY OF THE INVENTION

The invention relates to a rotor for a permanent magnet synchronous machine, having at least one laminated core comprising a plurality of laminations stacked in the direction of an axis of rotation of the rotor. A plurality of recesses is formed in the laminated core, in which respective permanent magnets are accommodated. Each recess has a first end region which is closer to the axis of rotation of the rotor than a second end region of the recess. Furthermore, the invention relates to a permanent magnet synchronous machine having such a rotor.

A rotor of the type mentioned above is described, for example, in DE 199 15 664 A1. Here, adjacent recesses assigned to respective magnetic poles of the rotor are arranged in a V-shape to accommodate the permanent magnets. The V-shapes of the recesses assigned to their respective magnetic poles widen in the radial direction. In end regions in which the recesses of a respective V-shape converge, a narrow web is present between the recesses, wherein the web is formed from the stacked laminations of the laminated core. In DE 199 15 664 A1 this narrow web is referred to as a scattering web.

When designing a rotor, or rotating part, for a permanent magnet synchronous machine, efforts are made to keep the width of such webs, i.e. the dimension of the respective web in the circumferential direction of the rotor, as small as possible. This is because an undesirable closing or short-circuiting of the magnetic field lines of the permanent magnets arranged in the recesses occurs in the region of these webs or scattering webs, wherein this closing or short-circuiting of the magnetic field lines is also referred to as a scattering. This undesirable electromagnetic scattering is disadvantageous because the power potential and torque potential of the electric machine are reduced due to the scattering.

The narrower the web between the adjacent recesses forming the V-shape opening in the radial direction of the rotor, the lower the magnetic scattering caused by the material of the laminations of the laminated core. Consequently, with a narrow design of the webs, it is possible to use permanent magnets with a lower mass than would be required to achieve a power or torque of equal magnitude with wider webs.

However, if the web or scattering web is very narrow, plasticizing occurs at high speeds of the rotor in the region in which the V-shaped recesses converge or approach each other, and from this region also towards the axis of rotation of the rotor. Such local plasticizing of the laminations of the laminated core, in particular in the region of notches, thus occurs above all with thin or narrow geometries of the webs and at high speeds of the rotor. These plasticizations in turn lead to material failure of the laminations, undesirable settling behavior in the entire structure of the rotor or, if necessary, to the formation of local cracks. The rotor may then no longer be able to meet the requirements placed on it in terms of speed or torque.

Furthermore, narrow scattering webs limit the mechanical strength of the laminated core, and therefore the laminated core could tear at the scattering webs at higher rotor speeds. Consequently, only a correspondingly lower maximum speed can be achieved. A higher speed stability can be achieved with wider scattering webs. However, more scattering then occurs, and more magnetic mass is required for the same torque. This is disadvantageous because the magnetic material of the permanent magnets is expensive.

The aim of a higher speed of the rotor can be to reduce the size of the permanent magnet synchronous machine and thus also the magnetic mass. A high speed stability combined with a high torque capability of the synchronous machine leads to a high power. Increasing the speed stability can thus be used to increase the power density.

It is true that the maximum power of the permanent magnet synchronous machine is not usually achieved at the maximum speed. Nevertheless, a reduced speed stability due to narrow scatter paths can lead to a reduction in either the maximum speed or the maximum torque at the transmission output when using a transmission that is operatively connected to a rotor shaft of the rotor and has a mechanical transmission ratio. These disadvantages can be compensated for by increasing the size of the electric synchronous machine or by increasing the magnetic mass. If the magnetic mass is increased, somewhat wider scatter paths must be provided again in order to achieve the same speed stability as with a rotor with a lower mass of permanent magnets and with narrow scatter paths.

However, as already mentioned, the provision of narrow webs or scattering webs reduces the speed stability of the rotor, i.e. the maximum speed up to which the rotor can be operated without damage occurring to the rotor during operation. This is because the laminations used to form the laminations have favorable electromagnetic properties, but these are associated with comparatively low yield strengths and low tensile strengths. Consequently, narrow webs are only capable to a limited extent of withstanding the loads occurring during operation of the rotor, i.e. during its rotation about the axis of rotation. In addition, the thickness of the laminations stacked in the laminated core is also comparatively small.

Ribs that are wide in the circumferential direction of the rotor ensure a higher achievable speed stability of the rotor. However, this has the disadvantage of a higher required magnetic mass if the same maximum torque is to be achieved with the permanent magnet synchronous machine as when using a rotor with narrower webs.

Conversely, narrower webs or scattering webs allow the use of permanent magnets with a lower respective mass. But then only a lower torque of the electric machine or synchronous machine which comprises the rotor can be achieved.

It is the object of the invention to create a rotor of the type mentioned above, by way of which an increased performance of the permanent magnet synchronous machine can be achieved with given permanent magnets, and to specify a permanent magnet synchronous machine having such a rotor.

This object is achieved by a rotor and a permanent magnet synchronous machine having the features of the claimed invention.

A rotor for a permanent magnet synchronous machine according to embodiments of the invention has at least one laminated core comprising a plurality of laminations stacked in the direction of an axis of rotation of the rotor. There is formed in the laminated core a plurality of recesses, in which respective permanent magnets are accommodated. Each recess has a first end region which is closer to the axis of rotation of the rotor than a second end region of the recess. Here, in recesses which are adjacent to each other in the circumferential direction of the rotor and the first end regions of which are closer to each other in the circumferential direction of the rotor than the second end regions, the permanent magnets are arranged in such a way that like poles of the permanent magnets face each other. In addition, the rotor has at least one holding part separate from the laminated core, by way of which a first portion of the laminated core bordering the adjacent recesses is coupled to a second portion of the laminated core bordering the adjacent recesses. The at least one holding part has a lower magnetic conductivity than a subregion of the laminated core having a volume equal to a volume of the holding part.

The provision of the holding part thus ensures that in the region in which the holding part holds together the portions of the laminated core bordering the adjacent recesses, there is less undesirable magnetic scattering in the form of a closure of the magnetic field lines of the permanent magnets than would be the case if, instead of the holding part, a subregion in the form of a web of the laminated core were responsible for holding together the portions of the laminated core. This is due to the fact that the at least one holding part has the lower magnetic conductivity than a subregion of the laminated core of the same volume, i.e. a subregion which has the same volume as the holding part. Due to the comparatively low magnetic conductivity of the at least one holding part, the magnetic field lines of the permanent magnets arranged in the adjacent recesses close or short-circuit to a lesser extent.

Nevertheless, the at least one holding part ensures the cohesion of the respective portions of the laminated core, which are spaced apart from one another in particular in the radial direction of the rotor and are preferably held together in this radial direction by the holding part. The holding part thus also ensures a higher speed stability of the rotor than would be the case without the provision of the holding part.

Consequently, by way of the rotor, with given permanent magnets accommodated in their respective recesses, it is possible to achieve an increased performance of the permanent magnet synchronous machine comprising the rotor.

Since the at least one holding part causes a reduction of the scattering of the magnetic field lines of the permanent magnets, which are arranged in the mutually adjacent recesses and similar magnetic poles of which face each other, a reduction of the magnetic mass and consequently a reduction of the manufacturing costs can be achieved for a given outer diameter of the rotor.

Alternatively, if the magnetic mass is not reduced or if the mass of the magnets is at most slightly reduced for a given outer diameter of the rotor, an increase in the performance of the permanent magnet synchronous machine can be achieved in the form of an increase in the maximum torque and/or the maximum power. Depending on whether or to what extent the mass of the permanent magnets is reduced, the various advantages of the reduction in manufacturing costs and the increase in performance are pronounced to differing degrees.

Due to the provision of the at least one holding part, it is also possible to realize particularly thin webs or webs that are particularly narrow in the circumferential direction of the rotor between the first end regions of the adjacent recesses without this having a detrimental effect on the speed stability of the rotor. Consequently, lightweight design potentials can be tapped or a rotor with a particularly low weight can be realized.

Furthermore, by providing the holding part in the region of the respective adjacent recesses, a particularly favorable distribution of the mechanical stresses in the laminated core can be achieved during operation of the rotor, i.e. during its rotation about the axis of rotation. This is because it can be ensured in particular that the mechanical load-bearing capacity of the materials is not exceeded. Accordingly, the mechanical strength of the rotor can be increased in the region of the holding parts, which results in higher speed stability. The circumferential direction of the rotor corresponds to the direction of rotation of the rotor when it rotates around its axis of rotation.

A particular advantage of the rotor is that the reduction in the scattering of the magnetic field in the region of the holding part can be decoupled from the reduction in speed stability that usually accompanies it. The rotor can thus be used in a permanent magnet synchronous machine which simultaneously has a high speed stability and a low magnetic mass and also a high maximum torque.

Preferably, the at least one holding part has a higher yield strength and/or a higher tensile strength than a subregion of the laminated core equal to the volume of the holding part. If such a holding part is used in the region of the respective adjacent recesses, namely where the first end regions of the adjacent recesses are close to each other, a particularly high strength of the rotor can be achieved in particular in the region in which the first portion and the second portion of the laminated core are coupled or connected to each other by the respective holding part.

If the at least one holding part has the higher yield strength and/or the higher tensile strength, the at least one holding part can provide a particularly thin web at this particular point of the rotor, at which the at least one holding part ensures the cohesion of the two portions of the laminated core. This provides lightweight construction options or allows the rotor to be designed with a particularly light weight. This applies in particular in comparison with a rotor in which the sheet metal material of the stacked laminations of the laminated core is used to achieve the same strength in the region of such webs.

Preferably, the at least one holding part is made of a material which has a lower magnetic conductivity than a material from which the laminations of the stack are made. In this way, the particularly low magnetic conductivity of the at least one holding part can be realized very simply and with little effort.

A number of materials can be used for the holding part, for example steel, aluminum, a fiber-reinforced plastic, in particular glass-fiber-reinforced plastic, ceramic or the like. All of these materials mean that a holding part made of such a material has a lower magnetic conductivity than would be the case for a part of the laminated core of which the volume is equal to the volume of the holding part. However, from a manufacturing point of view and also with regard to a desirably high strength of the holding part, certain materials are particularly suitable for providing the holding part.

Preferably, therefore, the at least one holding part is formed from a stainless steel. By using such a material to form the holding part, particularly good cohesion of the portions of the laminated core can be achieved. This applies in particular if the stainless steel or high-grade steel permits work hardening and/or hardening by other methods.

Preferably, the at least one holding part is made of a stainless steel with an austenitic structure. In particular, the magnetic conductivity of a stainless steel or high-grade steel with an austenitic structure is particularly low. In addition, such a stainless steel can be work-hardened very well and thus a particularly high material strength can be achieved.

In addition, the use of stainless steel with an austenitic structure to provide the holding part is advantageous with regard to the associated ductility of the holding part. This is because the holding part then exhibits a particularly high elongation at break. In other words, following an initially elastic deformation and plastic deformation after reaching the yield point, the holding part breaks significantly later than would be the case if a material were used for the holding part from which the laminations of the laminated core are formed.

An advantageously high ductility of the holding part with simultaneously high yield strength and high tensile strength is given in particular if the holding part is formed from a work-hardened stainless steel with an austenitic structure.

Preferably, the at least one holding part is form-fittingly connected to the portions of the laminated core. As a result, a particularly durable cohesion of the portions of the laminated core is achieved by the at least one holding part. This is advantageous with regard to the speed stability of the rotor.

Furthermore, in particular when using a stainless steel with an austenitic structure to provide the at least one holding part, a form-fitting connection to the portions of the laminated core can be realized very easily and well in terms of process technology, in particular by a thermal joining process.

Preferably, the at least one holding part has a web connecting respective ends of the holding part to one another. Here, a first end of the holding part is coupled to the first portion of the laminated core, and a second end of the holding part is coupled to the second portion of the laminated core. Such a shape of the holding part makes it possible, on the one hand, to realize a particularly thin web between the interconnected portions. And on the other hand, a good coupling of the holding part with the portions of the laminated core can be achieved. This is because the shape of the ends of the holding part can be very well matched to the region of the respective portion of the laminated core in which the coupling or connection between the laminated core and the ends of the holding part is formed.

Preferably, the web of the holding part is arranged between the first end regions of the adjacent recesses. In this way, the holding part can provide for the cohesion of the portions of the laminated core in a particularly effective manner.

It has proved further advantageous if the first end regions of the adjacent recesses are bounded by the web of the holding part. This is because in the region of the rotor in which the first end regions of the adjacent recesses are particularly close to each other, there is no material of the laminated core at all, which would lead to an undesired scattering or to an undesired closing of the magnetic field lines of the permanent magnets arranged in the adjacent recesses.

Preferably, the permanent magnets accommodated in the adjacent recesses are spaced from the web of the holding part. In such an arrangement, the region not occupied by other material or filled with air in the vicinity of the web of the holding part thus serves as a magnetic flux brake. This is particularly advantageous for reducing the undesired scattering of the magnetic field lines.

Preferably, the ends of the holding part have larger dimensions in the circumferential direction of the rotor than the web of the holding part. In this way, anchoring of the ends of the holding part to the respective portions of the laminated core can be achieved very easily.

Preferably, the ends of the holding part are arranged in corresponding receptacles, forming a respective form fit, wherein the receptacles are formed in the portions of the laminated core coupled to one another by way of the holding part. Such a form-fitting connection of the holding part to the portions of the laminated core ensures that the holding part can absorb particularly well tensile loads that occur during operation of the rotor, i.e. when the rotor rotates about the axis of rotation.

In particular, if a thermal joining process or temperature-indexed joining process is used to introduce the at least one holding part into the laminated core, a high tensile load can be absorbed by the holding part, which is form-fittingly connected to the portions of the laminated core. In this case, one joining partner, in particular the holding part, can be heated and introduced into the other joining partner in the heated state. Subsequent cooling of the previously heated joining partner then causes the holding part to apply tensile stress to the portions of the laminated core. Such shrinkage of one of the joining partners onto the other can also be achieved if the heated joining partner is the laminated core, while the holding part remains cold or is not heated in this joining process.

Preferably, an outer contour of the respective end of the holding part corresponds to an inner contour of the corresponding receptacle. In this way, the ends of the holding part can be easily inserted into the corresponding receptacles when manufacturing the rotor.

In particular, it can be provided that the respective end of the holding part is accommodated in the corresponding receptacle with substantially no play. In this case, a particularly good distribution of the tensile loads occurring during the rotation of the rotor about its axis of rotation can be achieved on the material of the laminated core which surrounds the respective end of the holding part in the region of the respective receptacle.

The latter advantage is given particularly if the outer contour of the respective end of the holding part is round in cross section. Thus, if the holding part has ends or head regions that are round in cross section, which are also accommodated at least largely without play in the corresponding receptacles, point loads in the region of the portions of the laminated core, which can occur when the rotor rotates about its axis of rotation, can be avoided to a particularly large extent.

However, it can also be provided that at least one free space is formed between an outer contour of the respective end of the holding part and an inner contour of the corresponding receptacle. Such an embodiment is particularly advantageous with regard to assembly, i.e. to the insertion of the at least one holding part into the laminated core in the region of the portions to be coupled together in each case. In addition, tolerances, in particular manufacturing tolerances, of the holding part and/or of the receptacles corresponding to the ends of the holding part can be compensated particularly well if the at least one free space is present between the outer contour of the respective end of the holding part and the inner contour of the corresponding receptacle.

In particular, the outer contour of the respective end of the holding part can be mushroom-head-shaped in cross section, i.e. can correspond in cross section to the cross section of a mushroom head. Such a design of one end or both ends of the holding part enables, in particular, good support of a respective underside of the mushroom head shape on a corresponding support surface which is provided on the side of the receptacle. This is advantageous with regard to the absorption of tensile loads by the holding part.

It can be provided that the respective end of the holding part rests with a straight contact surface against a corresponding contact surface of the holder. Providing such straight contact surfaces requires less effort in terms of production than is the case with curved, in particular round, contact surfaces. In addition, a good distribution of the load on the respective end of the holding part can be achieved in this way.

With regard to the loads occurring during operation of the rotor, i.e. during its rotation about its axis of rotation, it has been shown to be advantageous if the straight contact surfaces at the ends of the holding part are oriented substantially perpendicular to a radial direction of the rotor.

A permanent magnet synchronous machine according to embodiments of the invention has a rotor according to embodiments of the invention. The permanent magnet synchronous machine further comprises a stator, which has a stator winding for providing a magnetic rotary field. By way of the rotary field, rotation of the rotor about its axis of rotation can be effected.

The advantages and preferred embodiments described for the rotor according to the invention apply in an analogous manner to the permanent magnet synchronous machine according to embodiments of the invention.

Further features of the invention result from the claims, the figures and the figure description. The features and combinations of features mentioned above in the description, as well as the features and combinations of features mentioned below in the figure description and/or shown alone in the figures, can be used not only in the combination indicated in each case, but also in other combinations or on their own.

The invention will now be explained in greater detail with reference to preferred exemplary embodiments and with reference to the drawings.

DETAILED DESCRIPTION OF THE DRAWINGS

Figure 1:
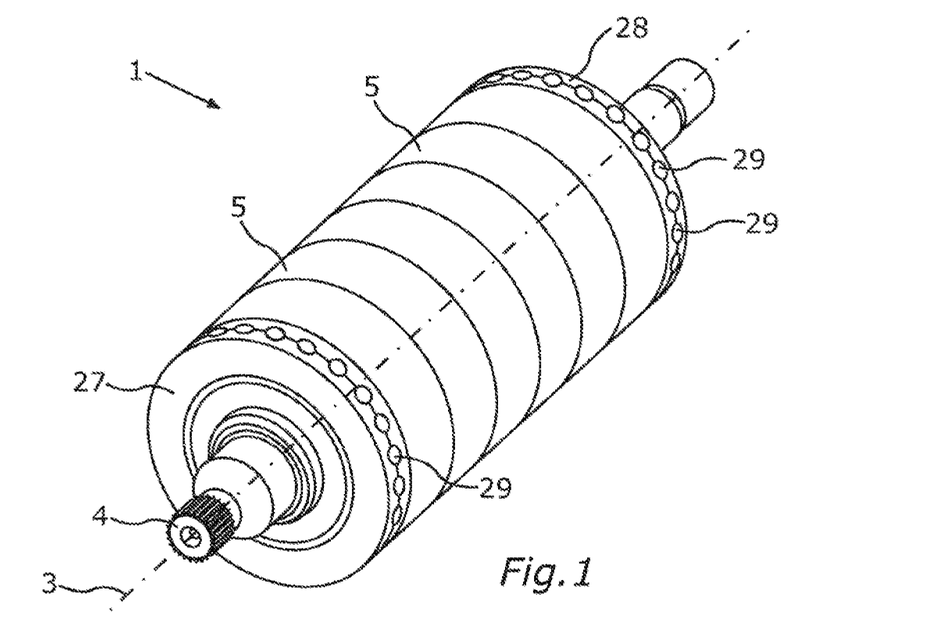
FIG. 1 shows a schematic and perspective view of a rotor for a permanent magnet synchronous machine, which has a plurality of laminated cores.
Figure 5:
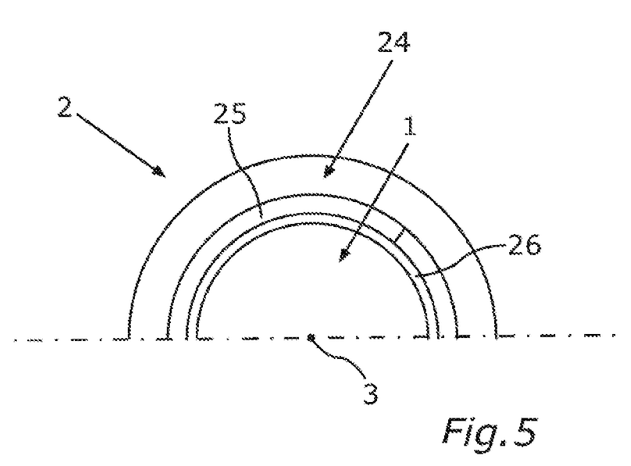
FIG. 5 shows a highly schematized view of part of a permanent magnet synchronous machine with the rotor comprising the holding parts according to FIG. 1.

FIG. 1 shows a schematic perspective view of a rotor 1, or rotating part, for a permanent magnet synchronous machine 2 (compare FIG. 5). In the embodiment of the rotor 1 shown by way of example in FIG. 1, the rotor 1 is formed as an internal rotor. However, the embodiment of the rotor 1 described below can also be used for a rotor formed as an external rotor.

In operation of the permanent magnet synchronous machine 2 (compare FIG. 5), the rotor 1 rotates about an axis of rotation 3, which in this case is arranged in the center of a rotor shaft 4 of the rotor 1. In a manner known per se, the rotor 1 has a plurality of laminated cores 5, only some of which are marked with a reference sign in FIG. 1 for reasons of clarity. Each of the laminated cores 5 has a large number of individual laminations 6 of smaller lamination thickness, one of which is shown schematically and in a plan view in the direction of the axis of rotation 3 in FIG. 2.

The laminations 6 are stacked in the respective laminated core 5 in the direction of the axis of rotation 3 and joined together, for example by welding. In particular, about 100 or even more than 100 laminations 6 can be arranged stacked in the direction of the axis of rotation 3 in each laminated core 5. The individual laminations 6 can be cut out of large, rolled metal sheets, for example by way of a laser tool or a punching tool, wherein recesses 7, 8 can be made in the various laminations 6.

Figure 2:
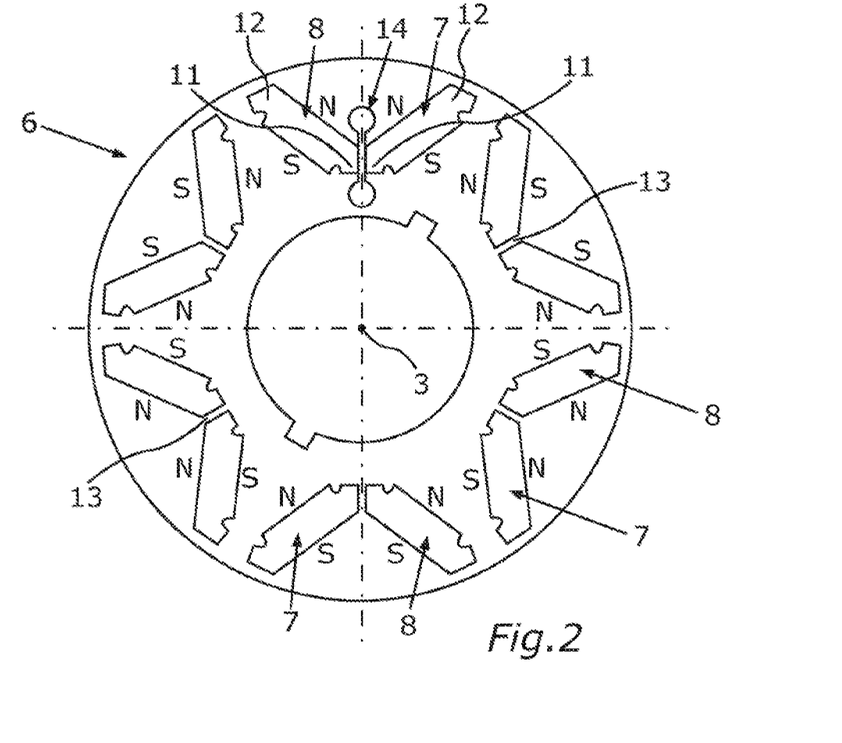
FIG. 2 shows a schematic and perspective plan view in the direction of an axis of rotation of the rotor of one of the stacked laminations which form a respective laminated core of the rotor.

In the present case, each individual lamination 6 for the rotor 1 of the permanent magnet synchronous machine 2 has a plurality of recesses 7, 8, of which only some are provided with a respective reference sign in FIG. 2 for reasons of clarity. In the laminations 6 of the laminated cores 5 stacked on top of each other in the direction of the axis of rotation 3, the recesses 7, 8 are aligned with each other so that the respective laminated core 5 also has corresponding recesses 7, 8.

In the recesses 7, 8, the rotor 1 of the permanent magnet synchronous machine 2 accommodates respective permanent magnets 9, 10 (compare FIG. 3 and FIG. 4), which are not shown in FIG. 2 for reasons of clarity.

In the present case, the permanent magnets 9, 10 are arranged in adjacent recesses 7, 8 in such a way that similar magnetic poles, i.e. the magnetic north poles N and the magnetic south poles S, of the permanent magnets 9, 10 accommodated in the adjacent recesses 7, 8 face each other. For example, in the two adjacent recesses 7, 8 shown in FIG. 2 above, the permanent magnets 9, 10 are arranged in such a way that the magnetic north poles N face each other. By contrast, in the recesses 7, 8 opposite these recesses 7, 8 in the radial direction, further permanent magnets 9, 10 (not shown in FIG. 2) are arranged in such a way that here the magnetic south poles S of the permanent magnets 9, 10 face each other.

The same is the case with the adjacent recesses 7, 8 in each case, which adjoin the recesses 7, 8 shown at the top in FIG. 2 in the circumferential direction of the rotor 1, i.e. in the direction of rotation about the axis of rotation 3. In the embodiment of the rotor 1 shown in FIG. 2, two permanent magnets 9, 10 in each case thus always alternate in the circumferential direction in adjacent recesses 7, 8, the magnetic north poles N of which face each other and the magnetic south poles S of which face each other.

Furthermore, in the rotor 1 of which the lamination 6 is shown in FIG. 2, the mutually adjacent recesses 7, 8 with the mutually facing similar poles of the permanent magnets 9, 10 are arranged in such a way that the adjacent recesses 7, 8 form a V-shape. In the embodiment of the laminations 6 shown in FIG. 2, the legs of the V-shape do not intersect in the region of the axis of rotation 3, but in the radial direction of the rotor 1 at a distance from the axis of rotation 3, namely in the region of the laminated core 5.

However, the explanations given below are also valid for a rotor 1 in which the recesses 7, 8 extend strictly in the radial direction so that the legs of the V-shape intersect in the region of the axis of rotation 3. In this embodiment of the rotor 1, however, in contrast to what is shown in FIG. 2, the permanent magnets 9, 10 are arranged in all the recesses 7, 8 adjacent to one another in the circumferential direction of the rotor 1 in such a way that similar magnetic poles N, S of the respective adjacent permanent magnets 9, 10 face one another. In this embodiment, the respective orientations of the permanent magnets 9, 10 accommodated in the recesses 7, 8 adjacent to one another in the circumferential direction of the rotor 1 thus alternate.

In the following, however, the V-shaped arrangement of the recesses 7, 8 shown in FIG. 2 and the arrangement of the permanent magnets 9, 10 illustrated in FIG. 2 by the indication of the magnetic poles N, S will be dealt with specifically for the purpose of illustrative explanation of the facts relating to the rotor 1.

Figure 3:
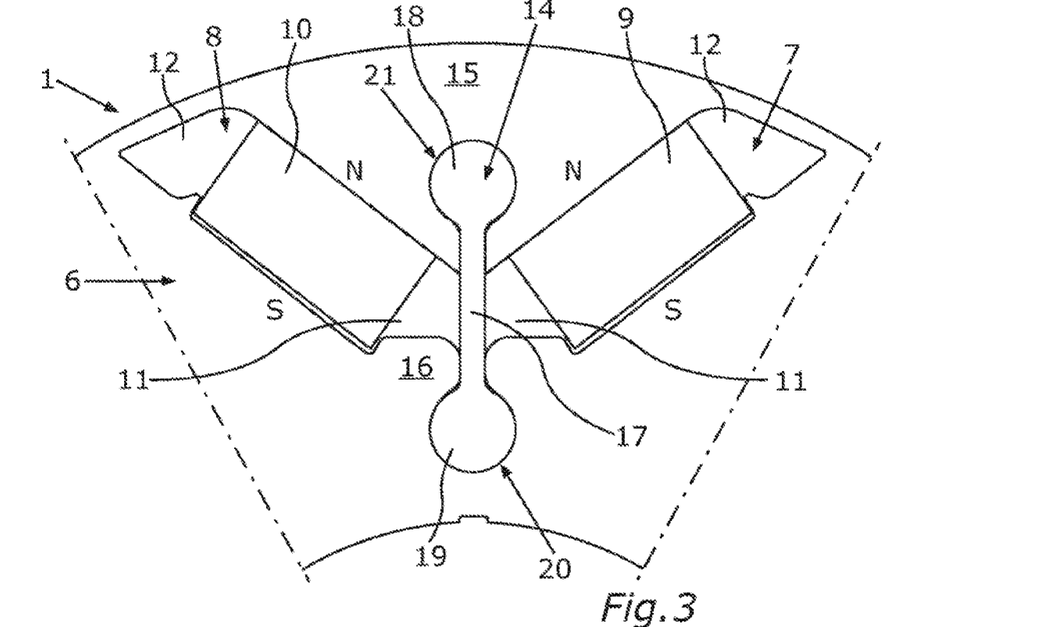
FIG. 3 schematically shows a detail of the rotor, wherein portions of the laminated core spaced apart from one another in the radial direction are held together by a holding part according to a first variant.

In this embodiment of the rotor 1, each two V-shaped recesses 7, 8, which are adjacent to each other in the circumferential direction of the rotor 1 and in which the permanent magnets 9, 10 are arranged in such a way that similar poles N, S of the permanent magnets 9, 10 face each other, have respective first end regions 11 and respective second end regions 12 (compare also FIG. 3).

The first end regions 11 of the recesses 7, 8 assigned to each other in each case are closer to the axis of rotation 3 of the rotor 1 than the second end regions 12 of these recesses 7, 8. Where the first end regions 11 of the recesses 7, 8 are very close to each other with similar poles of the permanent magnets 9, 10 accommodated in them and facing each other, webs or material bridges 13 are usually present in the laminated core 5, of which only some are provided with a reference sign in FIG. 2 for reasons of visualization.

In fact, however, in the rotor 1 shown in FIG. 1, instead of these material bridges 13, which are usually formed from the material of the laminations 6 of the laminated core 5, there are respective holding parts 14. In FIG. 2, for reasons of clarity, only one of these holding parts 14 is shown, of which respective variants are shown on an enlarged scale in FIG. 3 and in FIG. 4. In fact, however, such holding parts 14 are also present in the laminated core 5 wherever the material bridges 13 formed from the material of the laminations 6 are shown in FIG. 2.

The holding parts 14 are thus located at those points of the laminated core 5 at which, in the adjacent recesses 7, 8, the first end regions 11 of which are closer to one another in the circumferential direction of the rotor 1 than the second end regions 12, the permanent magnets 9, 10 are arranged in such a way that similar poles N, S of the permanent magnets 9, 10 face one another. The holding parts 14 thus replace in the rotor 1 in the laminated core 5 the material bridges 13 usually formed from the material of the respective laminations 6.

In the present case, the holding parts 14 are formed from a material which has a particularly low magnetic conductivity. The magnetic conductivity of the respective holding part 14 is lower than would be the case if the volume occupied by the holding part 14 were formed by a subregion of the laminated core 5 which has the same volume as the holding part 14.

The low magnetic conductivity of the holding part 14 ensures that in the region of the respective holding part 14 there is no or a particularly low and undesirable electromagnetic scattering, i.e. an undesirable closing of the magnetic field lines of the respective permanent magnet 9, 10. By contrast, such a closing of the magnetic field lines takes place if a magnetically conductive material such as the material bridge 13 is present in the rotor 1 instead of the holding parts 14. This is because the magnetically highly conductive material of the material bridges 13 ensures short-circuiting of the magnetic field lines of the respective permanent magnet 9, 10.

In a conventional rotor, efforts are therefore made to keep the width of the material bridges 13 of the respective laminations 5, which are also referred to as scattering webs due to the electromagnetic scattering caused by them, as small as possible. However, thin or narrow material bridges 13 or scattering webs in the circumferential direction of the rotor ensure that the rotor has low speed stability.

Both problems are advantageously avoided in the rotor 1 described here. The scattering web or the material bridge 13 between the adjacent recesses 7, 8 is replaced by the respective holding part 14, which is made of a magnetically non-conductive material or a material with a particularly low magnetic conductivity.

For this purpose, for example, the respective holding part 14 can be formed from a rust-resistant or stainless steel with an austenitic structure. In other words, the holding part 14 can form a scattering web which is made of stainless steel or high-grade steel, in particular stainless steel with an austenitic structure, and which reduces the undesired scattering or the undesired closing of the magnetic field lines of the permanent magnets 9, 10 to a particularly large extent.

At the same time, the holding part 14 ensures a high speed stability of the rotor 1. This is because the respective holding part 14 couples a first portion 15 of the laminated core 5 adjacent to the mutually adjacent or mutually associated recesses 7, 8 to a second portion 16 of the laminated core 5 adjacent to the mutually adjacent recesses 7, 8 (compare FIG. 3).

In this case, the first portion 15 of the laminated core 5 is further away from the axis of rotation 3 of the rotor 1 than the second portion 16 of the laminated core 5. Accordingly, the holding part 14 is particularly well suited to absorb tensile loads occurring during rotation of the rotor 1 about its axis of rotation 3. In other words, the holding part 14 assumes the mechanical cohesion of the portions 15, 16, in particular in the region between the mutually adjacent recesses 7, 8 arranged in a V-shape, in which the permanent magnets 9, 10 are arranged with similar poles N facing each other (compare FIG. 3).

During the manufacture of the rotor 1, a thermal joining process in particular can be used to fix the holding part 14 to the or in the laminated core 5 and thus to couple the holding part 14 to the portions 15, 16. For example, the holding parts 14 can be connected to the respective portions 15, 16 by welding.

As can be seen, for example, from FIG. 3, a web 17 of the holding part 14 preferably forms a respective boundary of the mutually adjacent recesses 7, 8. In other words, the adjacent recesses 7, 8 can be bounded in their first end regions 11 by the web 17 of the holding part 14.

Here, it is preferably provided that the permanent magnets 9, 10 accommodated in the adjacent recesses 7, 8 are spaced from the web 17 of the holding part 14. In other words, there is preferably no material at all formed by the respective lamination 6 of the laminated core 5 in the region of the laminated core 5 in which the mutually close end regions 11 of the adjacent recesses 7, 8 or mutually associated recesses 7, 8 converge, but only the web 17 of the holding part 14.

In an analogous manner, the permanent magnets 9, 10 are spaced from a radially outer edge of the respective recess 7, 8. Accordingly, magnetic flux barriers or magnetic flux brakes are preferably also provided by the second end regions 12 of the recesses 7, 8, because there is also no material formed by the laminations 6 of the laminated core 5 in these second end regions 12.

Due to the recess in the region of the usually provided material bridges 13 (compare FIG. 3) or due to this absence of material of the respective lamination 6 in this region, the electromagnetic design of the rotor 1 leads to a particularly high torque potential and power potential of the permanent magnet synchronous machine 2 for a given outer diameter of the rotor 1.

Alternatively, smaller permanent magnets 9, 10, which thus have a lower mass, can be used to obtain the same performance of the permanent magnet synchronous machine 2 as would be the case if the material bridge 13 were provided instead of the web 17 of the holding part 14. Thus, acquisition of expensive magnetic mass can be saved and/or the performance of the permanent magnet synchronous machine 2 can be increased.

In particular, if the holding part 14 is formed from a stainless steel with an austenitic structure, which has good work-hardening potential and is correspondingly work-hardened, particularly high material strengths of the laminated core 5 can be achieved where the holding part 14 holds the portions 15, 16 together. As a result, particularly thin geometries of the respective holding part 14 are possible. This opens up lightweight construction possibilities when designing the rotor 1 in comparison with a standard or usual rotor in which the material bridges 13 (compare FIG. 2) are present, which are formed from the material of the laminations 6.

In the variant of the holding part 14 shown in FIG. 3, respective ends 18, 19 of the holding part 14 are formed with an outer contour that is round in cross section. This outer contour corresponds in this case to an inner contour of a respective receptacle 20, 21, which is formed in the region of the respective portion 15, 16. In this case, the receptacle 20 for the end 19 of the holding part 14 has an inner contour which is round in cross section, and the receptacle 21 for the end 18 of the holding part 14 also has an inner contour which is round in cross section.

With this embodiment of the holding part 14, tearing of the laminated core 5 in the region of the holding part 14 can be avoided to a particularly large extent. This is because, due to the round outer contour of the respective ends 18, 19, the occurrence of mechanical stress peaks in the respective portions 15, 16 of the laminated core 5 can be particularly largely avoided during operation of the rotor 1.

Figure 4:
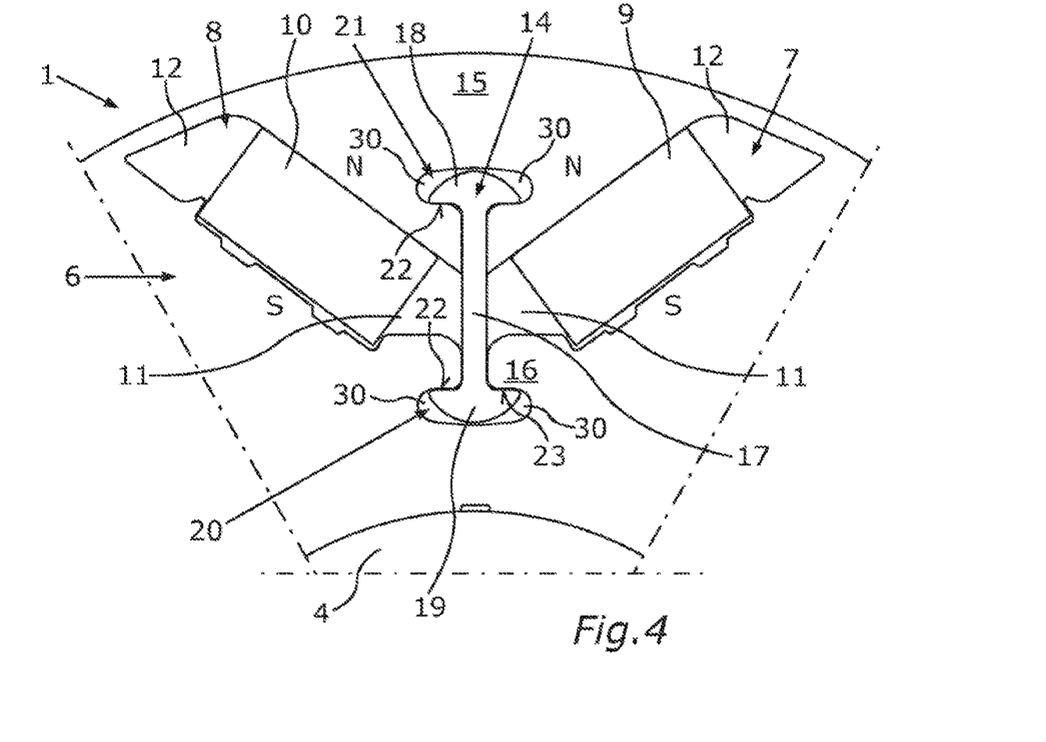
FIG. 4 shows schematically a detail of the rotor, wherein the portions of the laminated core spaced apart from one another in the radial direction are held together by a holding part according to a second variant.

In the variant shown in FIG. 4, the holding part 14 has a slightly different design than in the variant shown in FIG. 3. Namely, according to FIG. 4, the ends 18, 19 have different shapes than is the case with the holding part 14 shown in FIG. 3. Here, an outer contour of the respective end 18, 19 is formed in cross section in the manner of a mushroom head or is formed in accordance with the cross section of a mushroom head.

In addition, free spaces 30 are formed between the outer contour of the respective end 18, 19 and the inner contour of the corresponding receptacles 20, 21. The provision of these free spaces 30 facilitates the insertion of the holding part 14 into its installation position in the laminated core 5, since the ends 18, 19 can be inserted particularly well into the respective receptacles 20, 21.

In addition, the respective end 18, 19 has a straight contact surface 22 which rests against a corresponding contact surface 23 of the corresponding receptacle 20, 21. Such straight contact surfaces 22 or corresponding contact surfaces 23 are particularly easy to provide in terms of production technology. In addition, good support of the mushroom-head-shaped end 18, 19 on these contact surfaces 23 provided on the side of the portions 15, 16 can be achieved.

FIG. 4 also shows part of the rotor shaft 4 of the rotor 1, which is not shown in FIG. 3.

FIG. 5 shows a highly schematic sectional view of part of the permanent magnet synchronous machine 2 with the rotor 1. In a manner known per se, the permanent magnet synchronous machine 2 has a stator 24 with a stator winding 25 which is only indicated schematically here. An air gap 26 is formed between the stator 24 and the rotor 1. By way of the stator winding 25, a magnetic rotary field can be provided, by way of which rotation of the rotor 1 about its axis of rotation 3 can be effected during operation of the permanent magnet synchronous machine 2.

Of the rotor 1 arranged in such a permanent magnet synchronous machine 2, FIG. 1 also shows spring washers 27, 28 or cover discs, between which the laminated cores 5 are arranged pressed against each other. Holes can be made in these spring washers 27, 28 at a plurality of locations 29, wherein only some of these locations 29 are provided with a reference sign in FIG. 1. By providing corresponding holes at one or more of these locations 29, the rotor 1 can be balanced or imbalances in the rotation of the rotor 1 can be eliminated.

Overall, the examples show how, by providing a scattering web formed of stainless steel, for example, in the form of the holding parts 14 of the rotor 1 of the permanent magnet synchronous machine 2, a high speed stability of the rotor 1 can be achieved while at the same time achieving a high performance of the permanent magnet synchronous machine 2.

LIST OF REFERENCE SIGNS 1 rotor
2 synchronous machine
3 axis of rotation
4 rotor shaft
5 laminated core
6 lamination
7 recess
8 recess
9 permanent magnet
10 permanent magnet
11 end region
12 end region
13 material bridge
14 holding part
15 portion
16 portion
17 web
18 end
19 end
20 receptacle
21 receptacle
22 contact surface
23 contact surface
24 stator
25 stator winding
26 air gap
27 spring washer
28 spring washer
29 location
30 free space

The invention claimed is:

1. A rotor for a permanent magnet synchronous machine, the rotor comprising:
   a laminated core which comprises a plurality of laminations stacked in a direction of an axis of rotation of the rotor, wherein:
   a plurality of recesses are formed in the laminated core, in which recesses respective permanent magnets are accommodated, and wherein a respective recess has a first end region which is closer to the axis of rotation of the rotor than a second end region of the respective recess, in recesses which are adjacent to one another in a circumferential direction of the rotor and the first end regions of which are closer to one another in the circumferential direction of the rotor than the second end regions, the permanent magnets are arranged such that like poles of the permanent magnets face one another, the rotor has a holding part which is separate from the laminated core and by way of which a first portion of the laminated core bordering the adjacent recesses is coupled to a second portion of the laminated core bordering the adjacent recesses, the holding part has a lower magnetic conductivity than a subregion of the laminated core, a volume of which is equal to a volume of the holding part, the holding part has a web which connects respective ends of the holding part to one another, a first end of the holding part is coupled to the first portion of the laminated core and a second end of the holding part is coupled to the second portion of the laminated core, the holding part is form-fittingly connected to the portions of the laminated core, the ends of the holding part are arranged, forming a respective form fit, in corresponding receptacles which are formed in the portions of the laminated core coupled to one another by the holding part, at least one free space is formed between an outer contour of a respective end of the holding part and an inner contour of the corresponding receptacle, the outer contour is mushroom-shaped in cross section, the respective end of the holding part has a straight contact surface which rests against a corresponding contact surface of the receptacle, and the straight contact surface is oriented perpendicular to a radial direction of the rotor.

2. The rotor according to claim 1, wherein:
the holding part has at least one of a higher yield strength or a higher tensile strength than the subregion of the laminated core equal to the volume of the holding part.

3. The rotor according to claim 1, wherein:
the holding part is formed from a material which has a lower magnetic conductivity than a material from which the laminations of the laminated core are formed.

4. The rotor according to claim 1, wherein:
the holding part is formed from a stainless steel.

5. The rotor according to claim 1, wherein:
the holding part is formed from a stainless steel with an austenitic structure.

6. The rotor according to claim 1, wherein:
the web of the holding part is arranged between the first end regions of the adjacent recesses.

7. The rotor according to claim 6, wherein the adjacent recesses are bounded in their first end regions by the web of the holding part.

8. The rotor according to claim 1, wherein:
the permanent magnets accommodated in the adjacent recesses are spaced from the web of the holding part.

9. The rotor according to claim 1, wherein:
the ends of the holding part have larger dimensions in the circumferential direction of the rotor than the web of the holding part.

10. The rotor according to claim 1, wherein:
an outer contour of a respective end of the holding part corresponds to an inner contour of a corresponding receptacle, such that the respective end of the holding part is received in the corresponding receptacle substantially without play.

11. The rotor according to claim 10, wherein the outer contour is round in cross section.

12. A permanent magnet synchronous machine comprising:
the rotor according to claim 1, and
a stator which has a stator winding for providing a magnetic rotary field by way of which the rotor can be caused to rotate about the axis of rotation.

* * * * *